J. S. WILSON.
LOGGING ENGINE.
APPLICATION FILED JUNE 5, 1916.

1,329,870.

Patented Feb. 3, 1920.
3 SHEETS—SHEET 1.

J. S. WILSON.
LOGGING ENGINE.
APPLICATION FILED JUNE 5, 1916.

1,329,870.

Patented Feb. 3, 1920.
3 SHEETS—SHEET 2.

Inventor
J. S. Wilson
by W. C. ——
Attorney

J. S. WILSON.
LOGGING ENGINE.
APPLICATION FILED JUNE 5, 1916.
1,329,870.
Patented Feb. 3, 1920.
3 SHEETS—SHEET 3.
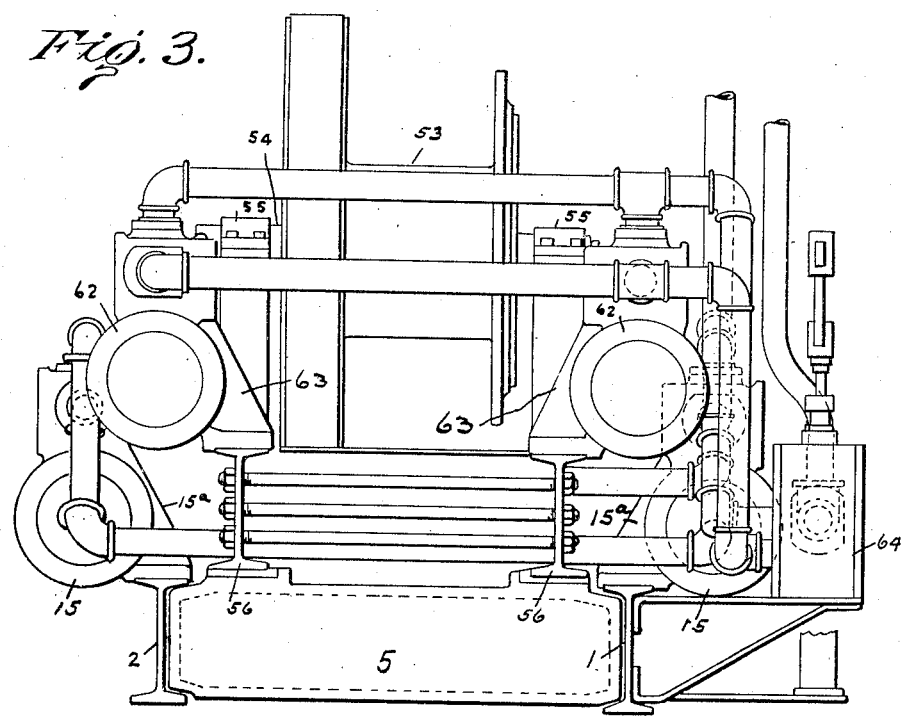
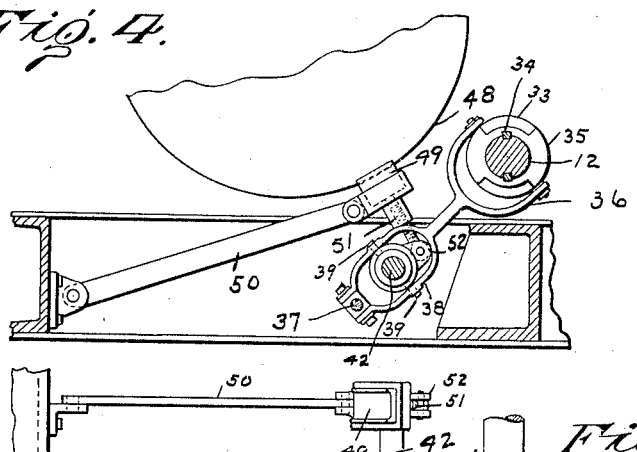
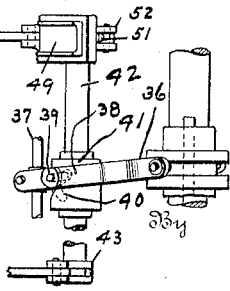
Inventor
J. S. Wilson
By H. C. Loui
Attorney

UNITED STATES PATENT OFFICE.

JOHN S. WILSON, OF PORTLAND, OREGON, ASSIGNOR TO WILLAMETTE IRON & STEEL WORKS, OF PORTLAND, OREGON, A CORPORATION OF OREGON.

LOGGING-ENGINE.

1,329,870.

Specification of Letters Patent.

Patented Feb. 3, 1920.

Application filed June 5, 1916. Serial No. 101,862.

*To all whom it may concern:*

Be it known that I, JOHN S. WILSON, a British subject, residing at Portland, in the county of Multnomah and State of Oregon, have invented new and useful Improvements in Logging-Engines, of which the following is a specification.

This invention relates to logging engines and consists in certain improvements in the construction thereof as will be hereinafter fully described and pointed out in the claims.

The invention is illustrated in the accompanying drawings as follows:—

Figure 1:
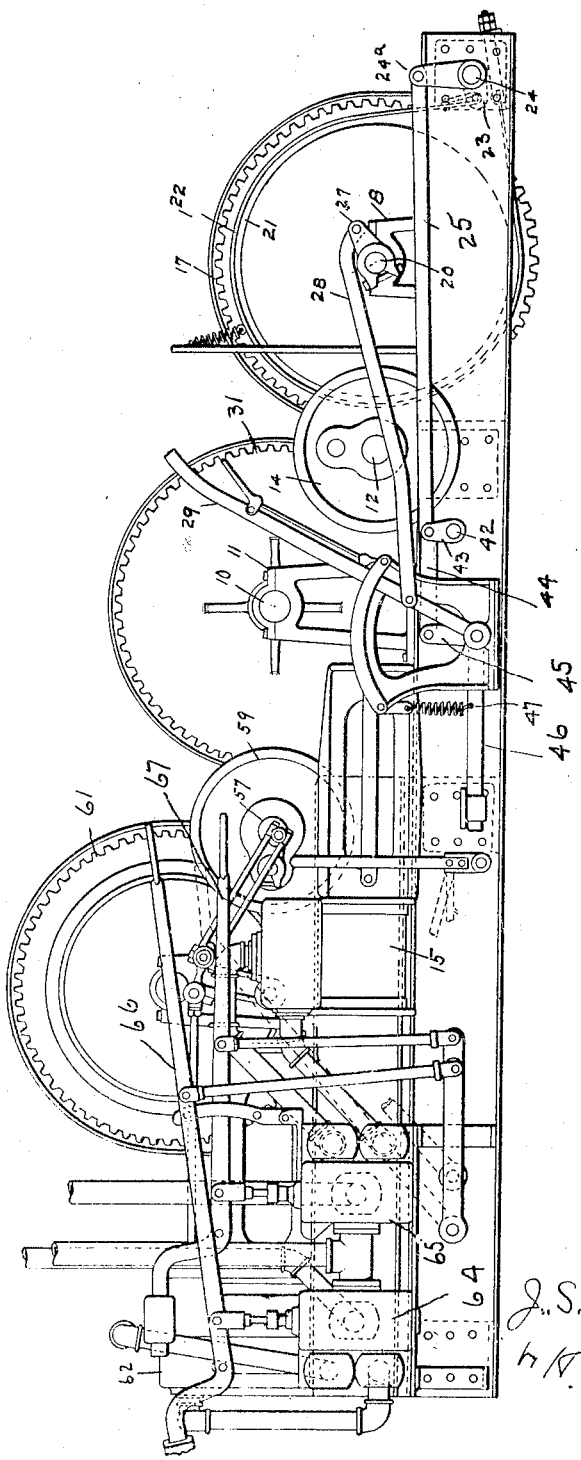

Figure 1 shows a side elevation of the engine.

Figure 2:
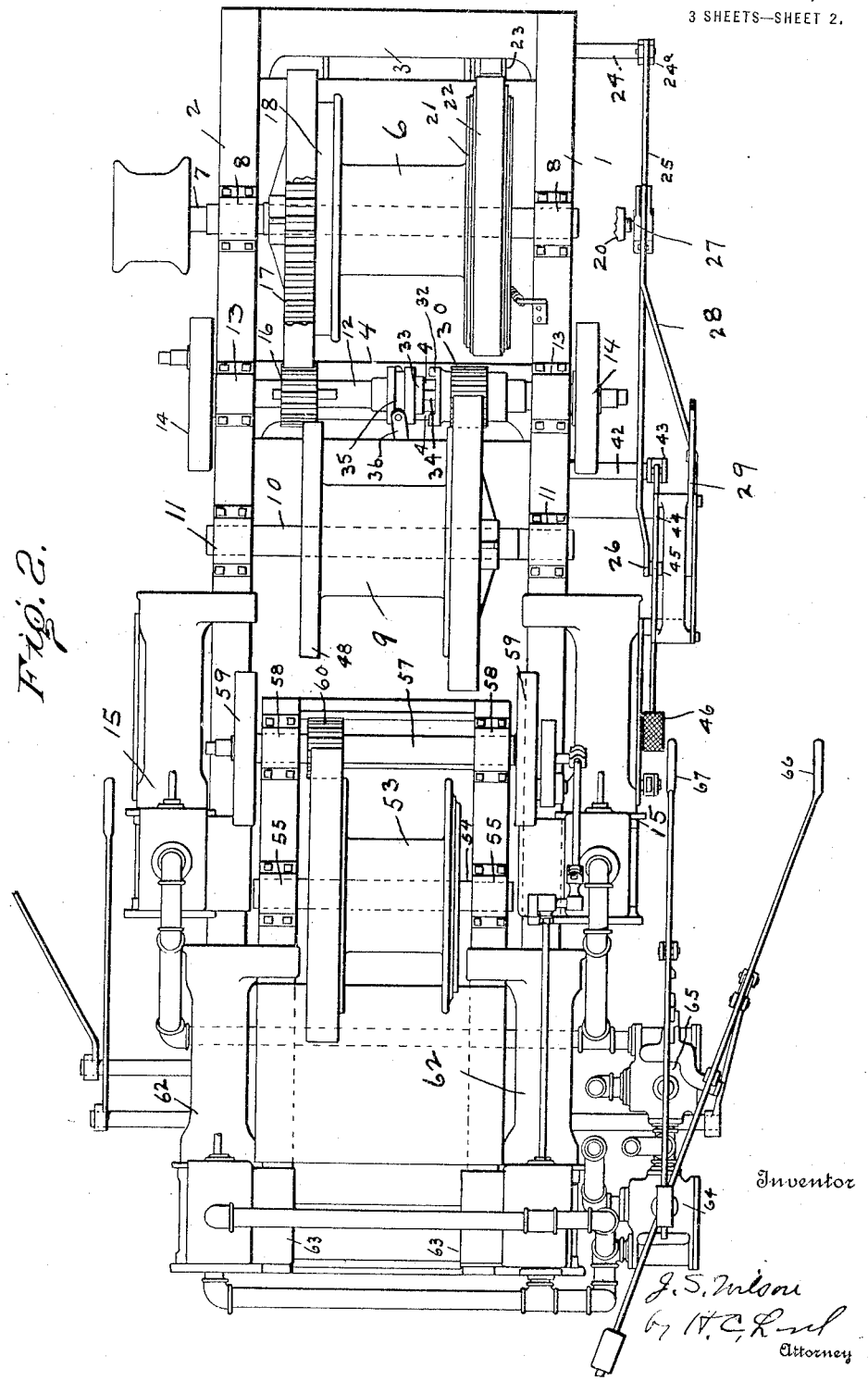

Fig. 2 a plan view of the engine.

Fig. 3 an end view.

Fig. 4 a sectional view of the clutch actuating mechanism on the line 4—4 in Fig. 2.

Fig. 5 a plan view of the parts shown in Fig. 4.

The frame is made up of the side beams 1 and 2 and the cross pieces 3, 4 and 5.

In the engine shown there are three drums which I will designate as the first, second and third drums, the second drum being in front of the first drum and the third drum in front of the second drum. The third drum 6 which is ordinarily used for spotting cars, etc., is mounted on a shaft 7 and the shaft 7 is journaled in bearings 8 on the frame. The second drum 9 is mounted on a shaft 10, the shaft 10 being journaled in bearings 11 on the frame. The drums 6 and 9 are driven from a shaft 12. The shaft 12 is journaled in the bearings 13 on the frame. This shaft 12 is a crank shaft, the cranks 14 being arranged at the ends of the shaft. The engines 15 which operate on the cranks 14 are shown in outline, the engines being double engines, having one cylinder at each side of the frame and set quartering as is the common practice. A gear 16 is fixed on the shaft 12 and meshes a gear 17 mounted on the shaft 7. A friction clutch 18 of common construction is adapted to lock the drum 6 with the gear 17. The clutch 18 is operated by a friction device 20 operating on the end of the shaft 7 and in the manner common to clutches and devices of this kind, one of which is shown in the patent to William H. Corbett, #807,109 Dec. 12, 1905.

One end of the drum has the brake surface 21 on which the brake band 22 operates, the brake band being actuated by a rock lever 23 carried by a shaft 24. The shaft 24 has a rock arm 24$^a$ and the rock arm 24$^a$ is connected by a link 25 with a controlling lever 26. The friction 20 has an operating lever 27 which is connected by a link 28 with an operating lever 29. The operation of the brake and the friction device is well known and of common construction.

The gear 30 is mounted on the shaft 12 and meshes with a gear 31 on the drum 9. The gear 30 has the detents 32 operating with the detents 33 completing a jaw clutch. The detents 33 are carried by a collar 35 which is locked against rotation on the shaft 12 by a spline 34. A lever 36 operates on the collar 35 and is fulcrumed on a rod 37 extending across the frame. The lever has a yoke 38 with pins 39 extending into spiral slots 40 in a sleeve 41. The sleeve 41 is fixed on a shaft 42. A rock lever 43 is mounted on the end of the shaft 42 and is connected by a link 44 with one arm 45 of a bell crank lever, the opposite arm 46 forming a foot lever by means of which the clutch having the detents 32 and 33 may be thrown into engagement. A spring 47 releases the clutch.

It is desirable, the instant the clutch is released, to set the brake on the drum 9 so as to lock it in position. For this purpose one flange is provided with a brake surface 48 which is engaged by a brake shoe 49. The brake shoe is carried by a link 50 and has a thrust rod 51 extending to a rock arm 52 on the shaft 42. When the shaft 42 is rotated to release the clutch the brake 49 is thrown into engagement and, on the other hand, when the clutch is thrown into engagement the brake is released.

The first drum 53 is mounted on a shaft 54 and the shaft 54 is journaled in the bearings 55 on I beams 56 (see Fig. 3) mounted on the cross pieces 5 between the beams 1 and 2. A drive shaft 57 is journaled in the bearings 58 on the beams 56 and the cranks 59 are arranged on the ends of the shaft 57. A gear 60 is fixed on the shaft 57 and meshes a gear 61 on the drum 53. The cranks 59 are driven by the engine 62, one cylinder being arranged at each side of the frame. The cylinders are carried by the brackets 63 on the beams 56 and the cylinders of the engines 15 are carried by brackets 15ª extending from the beams 1 and 2. Controlling valves 64 and 65 are arranged, one for each engine, and these are controlled by the operating levers 66 and 67. The controlling levers and detail construction of the engine may be as desired and it will be understood that the proper piping will be connected with the controlling valve and cylinders, at both sides of the engine.

By making the engines on different levels and placing one forward of the other a very compact construction is obtained. It is also desirable to make the upper cylinders slightly closer together than the lower cylinders so that certain parts of the mechanism will clear. This also adds to compactness.

These engines are used in different logging systems but more particularly in what is known as high-lead yarding. Here the blocks to which the cables run are carried to spar trees or other convenient supports and by making the drums tandem the cables may be more nearly centralized with the blocks to which the cables run. This is important in that the cables will spool more perfectly on the drum. In the use of the front loading drum, the second drum in the series, it is desirable to lock it instantly whenever the clutch is released otherwise it might drop the load and result in serious accident. The alternative clutch and brake device heretofore described accomplishes this purpose.

What I claim as new is:—

1. In a logging engine, the combination of two drums, one in front of the other, the rear drum being above the front drum; two engines each comprising two cylinders arranged in a horizontal plane, the cylinders of one engine being below and in front of the cylinders of the other engine; and driving connections between said engines and drums.

2. In a logging engine, the combination of a first, second and third drum, the second drum being in front of the first drum and the third drum being in front of the second drum, the rear drum being above the second drum and the second drum above the third drum; an engine for the first drum comprising two cylinders having their axes in a horizontal plane; a first driving connection between the first drum and the first engine; a second engine for driving the second and third drums comprising two cylinders having their axes in a horizontal plane, the cylinders of the second engine being in front of and below the cylinders of the first engine; and a second driving connection between the second engine and the second and third drums.

In testimony whereof I have hereunto set my hand.

J. S. WILSON.